(12) United States Patent
Yoshida

(10) Patent No.: US 8,446,740 B2
(45) Date of Patent: May 21, 2013

(54) FRAME REINFORCING STRUCTURE AND ELECTRONIC APPARATUS INCLUDING THE STRUCTURE

(75) Inventor: Takaya Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 292 days.

(21) Appl. No.: 12/517,976

(22) PCT Filed: Nov. 30, 2007

(86) PCT No.: PCT/JP2007/073256
§ 371 (c)(1),
(2), (4) Date: Jun. 5, 2009

(87) PCT Pub. No.: WO2008/069152
PCT Pub. Date: Jun. 12, 2008

(65) Prior Publication Data
US 2009/0268424 A1 Oct. 29, 2009

(30) Foreign Application Priority Data
Dec. 8, 2006 (JP) .................................. 2006-332667

(51) Int. Cl.
*H02B 1/01* (2006.01)
*H05K 1/14* (2006.01)
*H05K 5/00* (2006.01)
*H04M 1/00* (2006.01)

(52) U.S. Cl.
USPC ........... 361/829; 361/737; 361/752; 361/757; 455/575.3

(58) Field of Classification Search
USPC .................... 361/752, 755, 814, 829, 679.21, 361/749, 736–737, 756–759; 455/575.1, 455/575.2, 575.5, 575.3
See application file for complete search history.

(56) References Cited

U.S. PATENT DOCUMENTS

| D434,771 | S | * | 12/2000 | Ohtani | ......................... | D14/436 |
| D442,964 | S | * | 5/2001 | Ohtani | ......................... | D14/436 |
| 6,801,268 | B2 | * | 10/2004 | Huang et al. | .................... | 349/58 |
| 6,977,694 | B2 | * | 12/2005 | Natsuyama | ..................... | 349/60 |
| 2002/0002061 | A1 | * | 1/2002 | Miyasaka et al. | ............. | 455/557 |
| 2002/0063812 | A1 | * | 5/2002 | Natsuyama | ..................... | 349/58 |

(Continued)

FOREIGN PATENT DOCUMENTS

| JP | 2004228238 A | 8/2004 |
| JP | 2005066635 A | 3/2005 |
| JP | 2005303136 A | 10/2005 |
| JP | 2006050204 A | 2/2006 |

OTHER PUBLICATIONS

International Search Report for PCT/JP2007/073256 mailed Feb. 12, 2008.

*Primary Examiner* — Timothy Thompson
*Assistant Examiner* — Sherman Ng

(57) ABSTRACT

Even in a location where, for example, a notch section is formed, sufficient rigidity is secured. For this purpose, in reinforcing structure of a front case, a horizontal hemming-bent section 18 formed by folding work is disposed not only in a notch section 9, but also in regions near neighborhood regions 15 and 16. As a result, in the neighborhood regions 15 and 16 of the notch section 9, there is formed a location in which the horizontal hemming-bent section 18 overlaps with a sidewall section 7 along a side end edge to thereby provide reinforcement. Hence, also in the notch section 9, sufficient rigidity is secured.

11 Claims, 17 Drawing Sheets

U.S. PATENT DOCUMENTS

| | | |
|---|---|---|
| 2002/0189850 A1* 12/2002 | Yokoyama et al. | 174/250 |
| 2003/0053299 A1*  3/2003 | Kasuya et al. | 361/737 |
| 2005/0225950 A1* 10/2005 | Matsuda et al. | 361/737 |
| 2006/0119760 A1*  6/2006 | Okuda | 349/58 |
| 2006/0286847 A1* 12/2006 | Zuo et al. | 439/331 |

* cited by examiner

F I G. 5
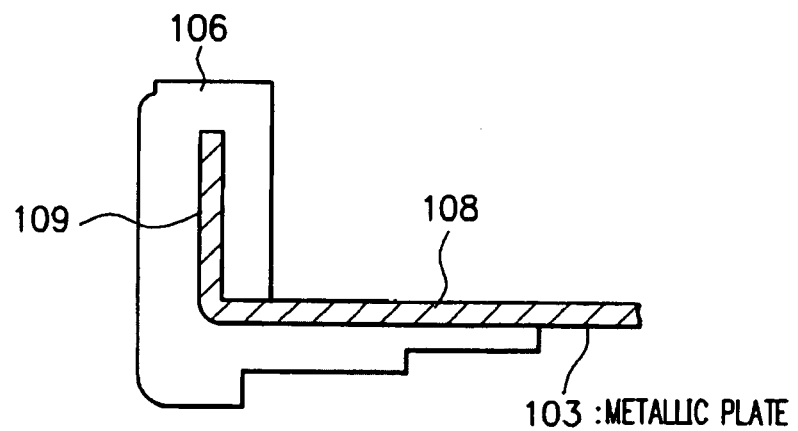
F I G. 6
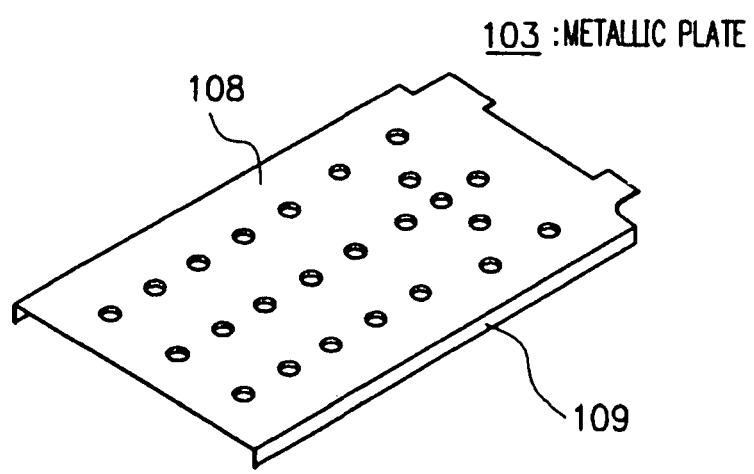

F I G. 17
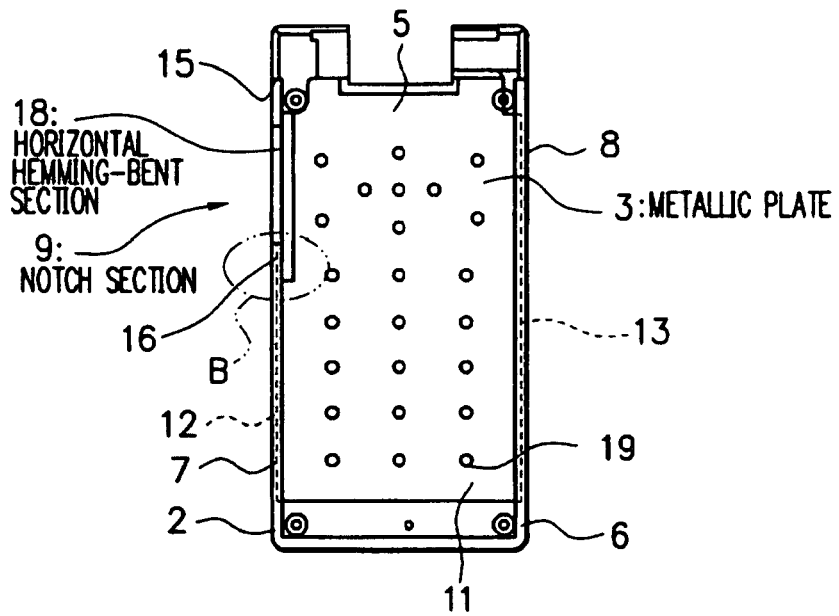
F I G. 18
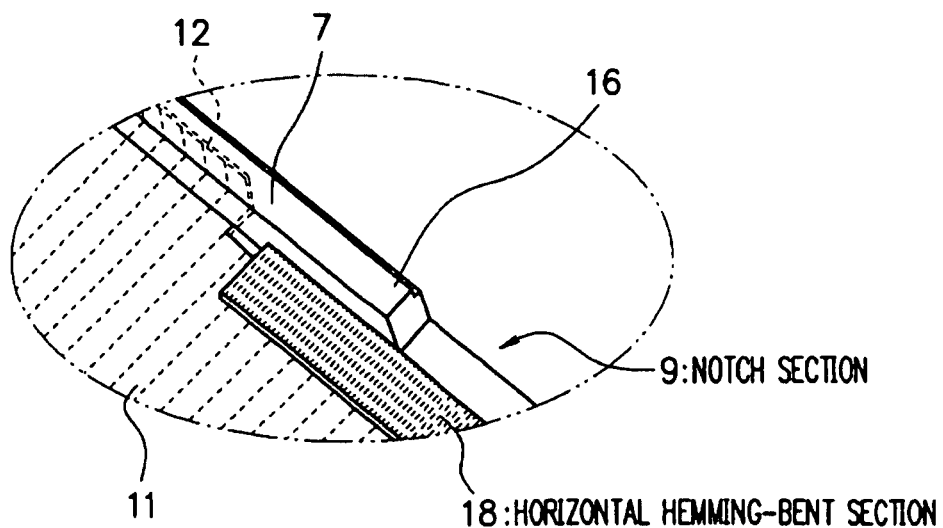

F I G. 19
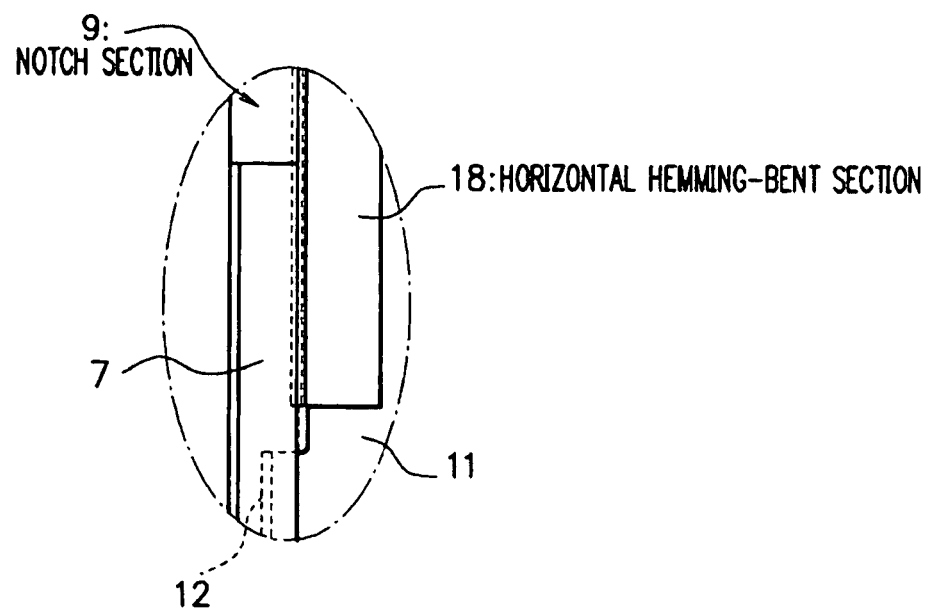
F I G. 20
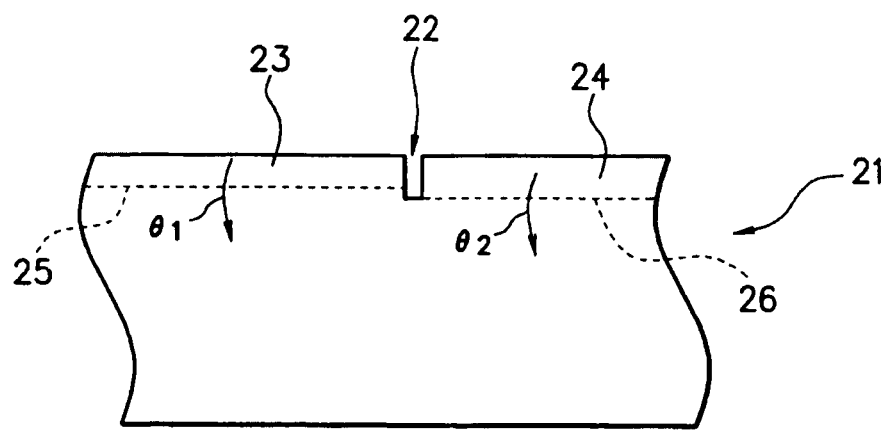

F I G. 21
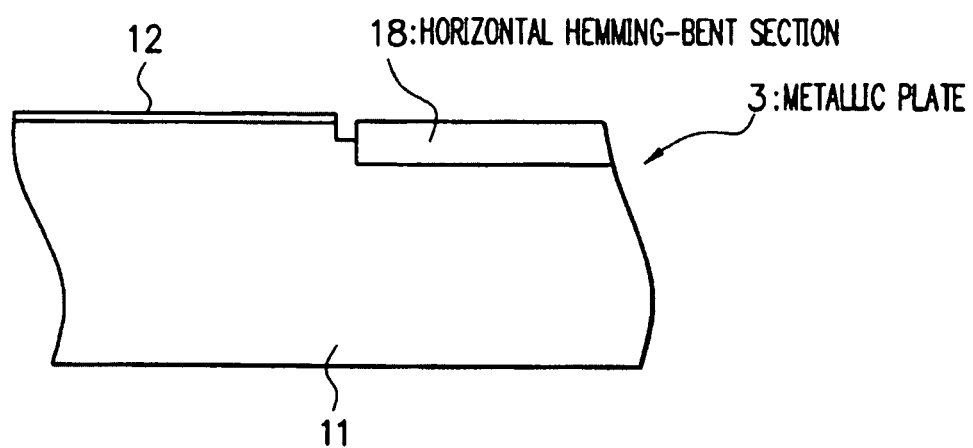
F I G. 22
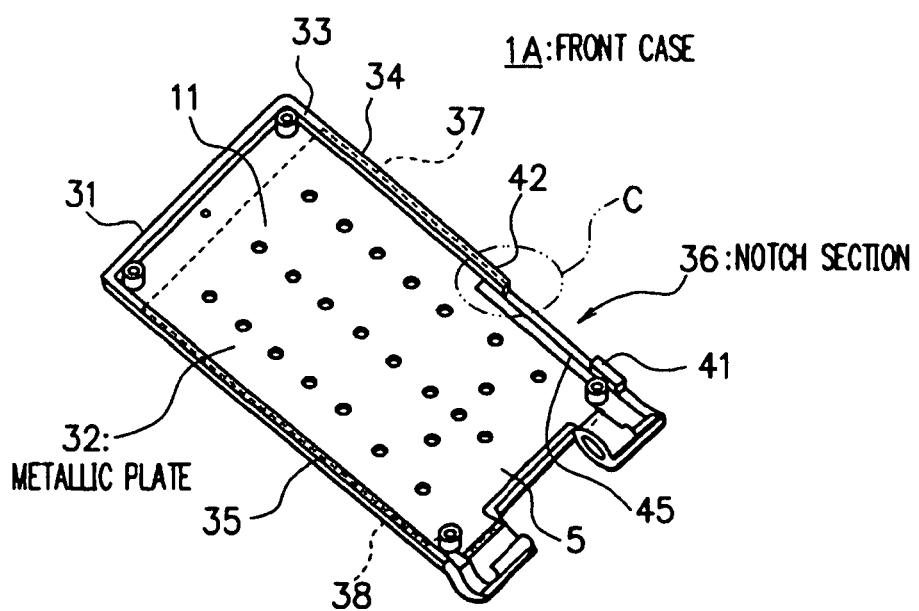

F I G. 31
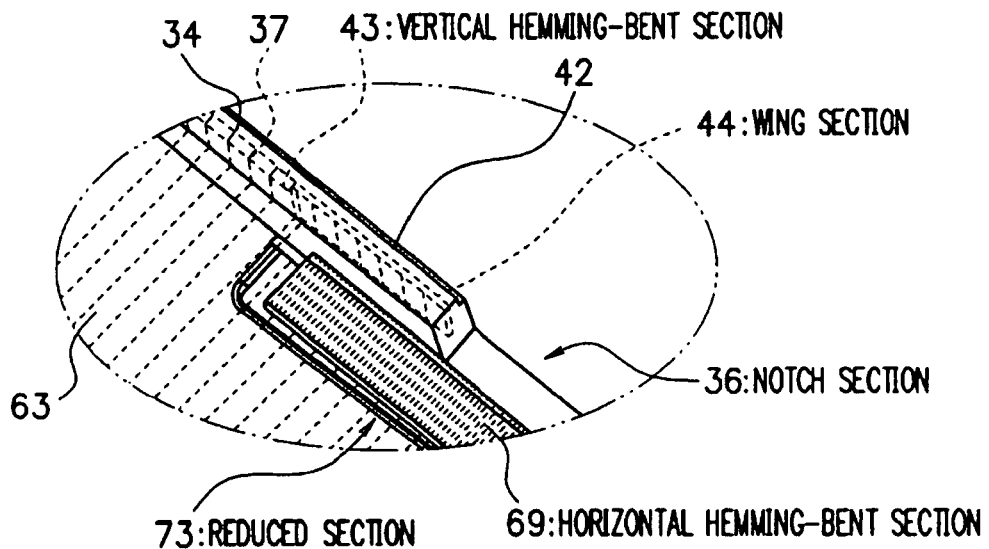
F I G. 32
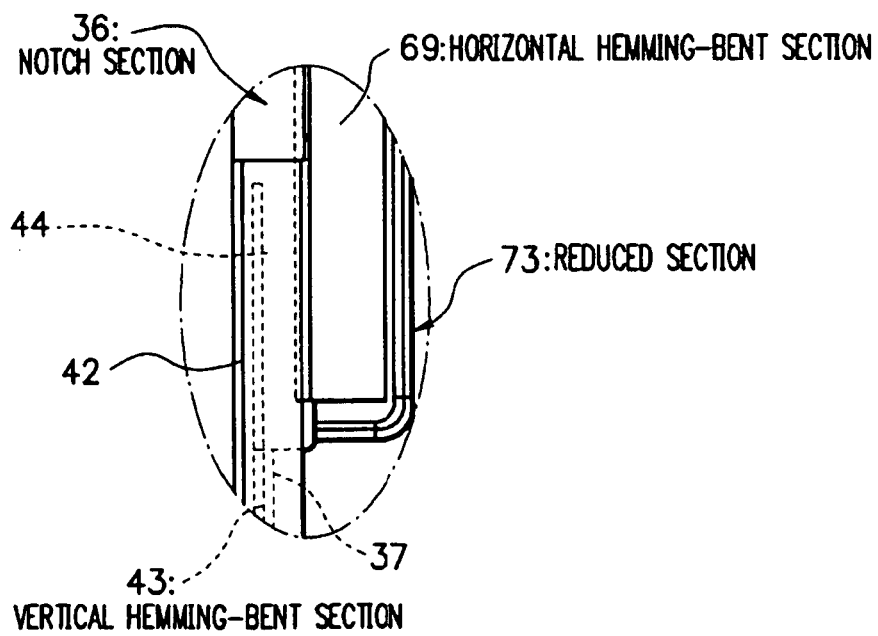

F I G. 33
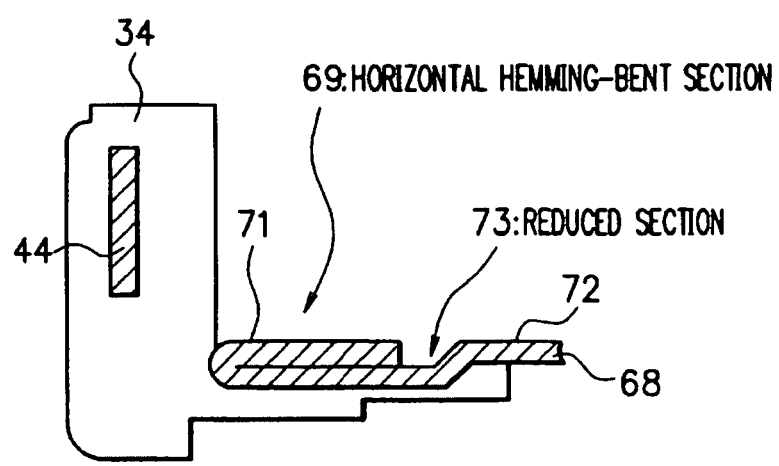

FRAME REINFORCING STRUCTURE AND ELECTRONIC APPARATUS INCLUDING THE STRUCTURE

TECHNICAL FIELD

The present invention relates to frame reinforcing structure and an electronic apparatus including the structure and, for example, to frame reinforcing structure and an electronic apparatus including the structure which is employed in a frame configuring a thin housing of an electronic apparatus such as a cellular and in which synthetic resin and a metallic plate are integrally molded by insertion molding.

RELATED ART

Recently, portable electronic apparatuses such as a cellular have been widely used due to high usability, i.e., because they are usable during the holders thereof are moving or when they are out from their ordinary places.

Additionally, there has been broadly employed a cellular having not only the inherent call function, but also a data communication function which makes it possible to communicate e-mails as well as to browse homepages by connecting to internet.

Further, recently, delivery services to deliver music pieces and videos via the internet have been widely utilized; information such as a music piece and a video can be downloaded, the downloaded information is recorded in a hard disk or the like as well as in, for example, a small memory card as a portable electronic recording medium, and information recorded in the memory card is read therefrom; hence, highly developed functions are provided.

On the other hand, there exists a need to reduce the cellular in size and thickness; to secure predetermined rigidity while meeting the requirements, by using a composite housing produced, for example, by integrally molding through insertion molding a synthetic resin molding body and a thin, highly rigid metallic plate, the rigidity is secured (reference is to be made to, for example, Patent Document 1 or the like).

For example, a front case 101 configuring such housing includes, as shown in FIGS. 1 to 5, a synthetic resin casing 102 and a metallic plate 103 having substantially a flat plate shape, which are integrally molded by insertion molding; the case 101 further includes a part mounting section 104 having a flat-plate shape and a frame section 105 formed to surround the periphery of the part mounting section 104. The frame section 105 includes a pair of sidewall sections 106 and 107.

The metallic plate 103 is manufactured through bending work of a planar member, and includes, as shown in FIGS. 6 and 7, a planar section 108 and sidewall sections 106 and 107 which configure a part mounting section 104, as well as side-plate sections 109 and 110 which are disposed on both side sections of the planar section 108 and which are formed by bending the metallic plate 103 with substantially a right angle with respect to the planar section 108.

Incidentally, the front case 101 shown in FIGS. 1 to 5 is configured as a housing in which an upper housing and a lower housing are coupled with each other by a hinge section such that the housing is foldable.

However, in a cellular, with the increase of functions as described above, it is essential to form a notch section in a sidewall section of the housing of the cellular to arrange therein an external memory inserting hole, key buttons (side keys), a headphone jack section, connectors to connect a charge cable and the like.

That is, such front case 201 includes, as shown in FIGS. 8 and 9, a casing 202 made of synthetic resin and a metallic plate 203 having substantially a flat-plate shape which are integrally molded by insertion molding, as well as a planar part mounting section 204 and a frame section 205 formed to surround the periphery of the part mounting section 204.

The frame section 205 includes a pair of sidewall sections 106 and 107, and a notch section 208 is disposed in a predetermined location of, for example, one of the sidewall sections, i.e., the sidewall section 206.

The notch section 208 is combined with a notch section disposed in a corresponding location of the rear case to configure an insertion hole or the like.

The metallic plate 203 is manufactured through bending work of, for example, a planar member and includes, as shown in FIGS. 8 to 20, a planar section 209 and sidewall sections 206 and 207, which configure a part mounting section 204, as well as sidewall sections 210 and 211 which are disposed on both sides of the planar section 209 and which are formed by bending the metallic plate 203 with substantially a right angle with respect to the planar section 209.

In one of the sidewall sections, i.e., the sidewall section 210, a notch section 208 is removed from the sidewall section 206 as shown in FIGS. 10 and 11.

However, even by using a composite housing as above, the metallic plate is also removed from the notch location; hence, the housing is remarkably reduced in rigidity in this location.

To secure the rigidity, it is favorable to adopt a housing in which the notch section is not disposed to a possibly maximum extent; however, as described above, to provide many functions, it is essential to arrange notch sections.

Hence, although there is required a measure to secure the rigidity, for example, to attach a reinforcing member in the housing, this is disadvantageous for the reduction in size and thickness.

To cope with the difficulty, there has been proposed a technique in which the region of the metallic plate in the notch section, which is conventionally separated, is bent (folded) through hemming bending work to thereby enhance the rigidity (reference is to be made to, for example, Patent Document 2).

Such front case 301 includes, as shown in FIGS. 12 and 13, a casing 302 made of synthetic resin and a metallic plate 203 having substantially a flat-plate shape which are integrally molded by insertion molding, as well as a planar part mounting section 304 and a frame section 305 formed to surround the periphery of the part mounting section 304. The frame section 305 includes a pair of sidewall sections 306 and 307, and a notch section 308 is disposed in a predetermined location of, for example, one of the sidewall sections, i.e., the sidewall section 306.

The notch section 308 is combined with a notch section disposed in a corresponding location of the rear case to configure an insertion hole or the like.

The metallic plate 303 is manufactured through bending work of, for example, a planar member and includes, as shown in FIGS. 12 to 15, a planar section 309 configuring a part mounting section 304, and side-plate sections 310 and 311 which configure sidewall sections 306 and 307 and which are formed by bending the metallic plate 303 with substantially a right angle with respect to the planar section 309, on both sides of the planar section 309.

In one of the side-plate sections, i.e., a side-plate section 310, a notch section 308 is removed from the sidewall section 306 as shown in FIGS. 14 and 15; in the planar section 309, a region thereof near the notch section 308 in its side edge section is bent (folded) by hemming bending work for substantially the height of the side-plate section 310, to provide a hemming-bent section 312 in which the thickness of the reinforcing member is substantially doubled in the region associated with the width relative to the side edge end corresponding to the height of the side-plate section 310.

Patent Document 1: Japanese Patent Laid-Open Publication No. 2004-228238

Patent Document 2: Japanese Patent Laid-Open Publication No. 2005-303136

DISCLOSURE OF THE INVENTION

Problem to be Solved by the Invention

The problem to be removed is a point in which the sufficient rigidity cannot be easily secured still in the related techniques of the present invention described above.

That is, along the sidewall section, a gap takes place between the edge section on the notch section of the sidewall section and the edge section of the hemming-bent section. In other words, along the sidewall section, there appears a region in which neither the sidewall section nor the hemming-bent section exists. Hence, rigidity locally decreases in this location, and there is a fear that the housing is broken or deformed due to a shock or the like when it is dropped.

The present invention is devised in consideration of the situation above and aims to provide frame reinforcing structure and an electronic apparatus including the structure in which, for example, also in a location where a notch section or an opening is formed, sufficient rigidity can be secured while implementing the reduction in the thickness of the housing.

Means for Solving the Problem

To remove the problem, the frame reinforcing structure in accordance with the present invention relates to frame reinforcing structure in which at least one side configuring the edge end of a rectangular notch section or opening formed in a frame is folded to provide a hemming edge end section, characterized in that the hemming edge end section extends over the first point and the end point of the at least one side configuring the edge end of the notch section or the opening.

Furthermore, the electronic apparatus in accordance with the present invention relates to an electronic apparatus including a card slot or a memory slot, characterized in that frame reinforcing structure in accordance with above-described claims is applied to the card slot or the memory slot.

Advantages of the Invention

In accordance with the configuration of this invention, the hemming edge end section is formed to extend over the start point and the end point of at least one side configuring the edge end of the notch section or the opening; hence, for example, also in the notch section and the opening, sufficient rigidity can be secured while implementing the reduction in the thickness of the housing.

BEST MODE FOR CARRYING OUT THE INVENTION

Since the hemming edge end section is formed to extend over the start point and the end point of at least one side configuring the edge end of the notch section or the opening, the object is achieved, i.e., for example, also in the notch section and the opening, sufficient rigidity can be secured while implementing the reduction in the thickness of the housing.

First Exemplary Embodiment

FIG. 16 is a perspective view showing structure of a front case of a lower unit of a cellular as a first exemplary embodiment of this invention, i.e., a diagram viewed from the rear surface side; FIG. 17 is a plan view showing structure of the front case; FIG. 18 is a partial, magnified view showing a magnified view of section A of FIG. 16; FIG. 19 is a partial, magnified view showing a magnified view of section B of FIG. 17; and FIGS. 20 and 21 are explanatory diagrams to explain a method of working a metallic plate configuring the front case.

The front case 1 of this example configures a housing (a composite housing) of the cellular as an electronic apparatus and includes, as shown in FIGS. 16 and 17, a frame-shaped casing (resin molding body) 2 made of synthetic resin and a substantially planar metallic plate (metallic sheet) 3, which are integrally molded through insertion molding.

The cellular includes an upper unit and a lower unit, which are coupled with each other by a hinge section such that the cellular is foldable.

The upper unit is substantially configured by mounting, in an oblate upper housing, a display section including, for example, a liquid-crystal display unit, a receiver section to produce a received audio during a call, and the like; the lower unit is substantially configured by mounting, in an oblate lower housing, a control unit including, for example, a Central Processing Unit (CPU), a storage including a semiconductor memory such as a ROM and a RAM, a wireless communication section to carry out a call and data communication, an operator's section including various operation keys and the like, a transmitter section to input an audio to be transmitted, a power source section including a battery pack, and the like.

Each of the upper housing and the lower housing includes a front case to configure an inner-surface side and a rear case to configure an outer-surface side, and the front case and the rear cases are combined with each other to be assembled by the engaging of ribs or by the tightening of fixing tools including a female screw and a male screw.

The front case 1 of this example configures the lower housing and includes, as shown in FIGS. 16 and 17, a planar part mounting section 5 and a frame section 6 formed to surround the periphery of the part mounting section 5. The frame section 6 includes a pair of sidewall sections 7 and 8, and a notch section 9 is disposed in a predetermined location of, for example, one of the sidewall sections, i.e., the sidewall section 7.

The notch section 9 is combined with a notch section disposed in a corresponding location of the rear case to configure an insertion hole or the like.

The casing 2 is made of a synthetic resin molding material such as an ABS resin, a polycarbonate, or the like.

The metallic plate 3 is manufactured through bending work of, for example, a planar member of stainless steel and includes a planar section 11 configuring a part mounting section 5, and side-plate sections 12 and 13 which configure sidewall sections 7 and 8 and which are formed by bending the metallic plate 3 with substantially a right angle with respect to the planar section 11, on both sides of the planar section 11.

In one of the side-plate sections, i.e., a side-plate section 12, a notch section 9 and neighborhood regions 15 and 16 on both sides of the notch section 9 are removed from the sidewall section 7 as shown in FIGS. 16 to 19; in the planar section 11, regions thereof near the notch section 9 and the neighborhood regions 15 and 16 on both sides of the notch section 9 in its side edge section are bent by hemming bending work for substantially the height of the side-plate section 7 relative to the side edge end, to provide a hemming-bent section 18 in which the thickness is substantially doubled.

Additionally, on an inner surface of the metallic plate 3, there are formed a plurality of fine projections 19 to support a metallic dome sheet configuring the operator's section. The metal dome sheet is arranged below a key sheet and projects in a dome contour, the dome sheet being provided with metallic plate contact points which configure switches.

Incidentally, in FIG. 18, an area in which dotted lines are drawn with an equal distance therebetween indicates the metallic plate 3.

As above, the reinforcing structure of the front case (the reinforcing structure of the frame) of this example is substantially configured such that in the planar section 11 of the metallic plate 3, regions thereof near the notch section 9 and the neighborhood regions 15 and 16 on both sides of the notch section 9 in its side edge section are bent by hemming bending work for substantially the height of the side-plate section 7, to provide the hemming-bent section 18, and in the neighborhood regions 15 and 16 of the notch section 9, there are disposed locations in which the hemming-bent section 18 overlaps with the sidewall section 7.

That is, viewed from the side, of three edge ends of the notch section 9, the edge end included in the edge end of the planar section 11 is included in the edge end section of the horizontal hemming-bent section 18, and regions (i.e., the neighborhood regions 15 and 16) on the side of the sidewall section 7 having as ends thereof the first point and the last point of the edge end of the notch section 9 overlap with the edge end section of the horizontal hemming-bent section 18.

In this fashion, not only the notch section 9, but also the regions adjacent to the neighborhood regions 15 and 16 are the horizontal hemming-bent section 18; hence, in the neighborhood regions 15 and 16, the horizontal hemming-bent section 18 overlaps with the sidewall section (only the resin mold section in this example) 7 along the sidewall section 7, to thereby provide reinforcement.

A notch section is formed in a corresponding location of the rear case to be combined therewith to provide an insertion hole (slot) of an external memory such as an SD card, an opening to expose side-key buttons, a jack section for a headphone or the like, and an opening to expose connectors to connect a charge cable and the like.

To manufacture the front case 1 of this example, a notch section 22 is first disposed, as shown in FIG. 20, in a predetermined location of the side edge section of a planar metallic (alloy) member 21, and then a side-plate section forming region 23 is separated from a hemming-bent section forming region 24. The notch section 22 is required for the bending work of the metallic plate and has a width of about 0.5 mm to about 1.0 mm in this example.

Next, along a bending line 25 for the forming of the side-plate section, the side-plate section forming region 23 is bent toward the inside with a bending angle $\theta_1$ set as ($\theta_1=90°$) to form a side-plate section 12 as shown in FIG. 21; and along a bending line 26 for the forming of the hemming-bent section, the hemming-bent section forming region 24 is bent (folded) toward the inside with a bending angle $\theta_2$ set as ($\theta_2=180°$) to form a horizontal hemming-bent section 18. The side-plate section 13 is formed by similarly bending, along a bending line for the forming of the side-plate section, the side-plate section forming region 90° toward the inside. In this way, the metallic plate 3 is manufactured.

Next, a metallic mold including an upper mold and a lower mold is prepared; in a state wherein the upper mold is combined with the lower mold and the metallic plate 3 is accommodated in a hollow formed in the inside of the molds, the lower and upper molds are tightly fixed.

In this state, a top end of an injection molder is placed at the gate and the molder is operated to inject molten resin from the gate into the hollow.

When the hollow is filled with the molten resin, the injection is suspended; after cooling the resin, the molds are separated to take out the front case 1 in which the metallic plate and the casing (resin-molded body) are integrally molded.

In the reinforcing structure of the front case of this example, not only the notch section 9, but also in the regions adjacent to the neighborhood regions 15 and 16 are the horizontal hemming-bent section 18; hence, in the neighborhood regions 15 and 16, the horizontal hemming-bent section 18 overlaps with the sidewall section 7 along the sidewall section 7, to thereby provide reinforcement. This secures the sufficient rigidity also in the notch section 9.

As above, in accordance with the configuration of this example, in the notch section 9, the side edge section of the planar section 11 of the metallic plate 3 is bent by hemming bending work for substantially the height of the side-plate section 7, and a portion thereof associated with the width which is substantially the height of side-plate section 7 relative to the side edge end is the horizontal hemming-bent section 18 in which the thickness is substantially doubled; hence, the sufficient rigidity is secured in the notch section 9.

Moreover, not only the notch section 9, but also in the regions adjacent to the neighborhood regions 15 and 16 are the horizontal hemming-bent section 18; hence, in the neighborhood regions 15 and 16 of the notch section 9, the horizontal hemming-bent section 18 overlaps with the sidewall section 7 along the sidewall section 7, to thereby provide the reinforcement; as a result, the rigidity can be further enhanced while reducing the thickness.

Second Exemplary Embodiment

FIG. 22 is a perspective view showing structure of a front case of a lower unit of a cellular as a second exemplary embodiment of this invention, i.e., a diagram viewed from the rear surface side; FIG. 23 is a plan view showing structure of the front case; FIG. 24 is a partial, magnified view showing a magnified view of section C of FIG. 22; FIG. 25 is a partial, magnified view showing a magnified view of section C of FIG. 23; FIG. 26 is a cross-sectional view along line E-E of FIG. 23, and FIGS. 27 and 28 are explanatory diagrams to explain a method of working a metallic plate configuring the front case.

This example considerably differs from the first exemplary embodiment above in that a metallic plate side-plate section is arranged also in a neighborhood region of the notch section of the sidewall section.

The other configurations are almost equal to those of the first exemplary embodiment; hence, the same configuring components as those of the first exemplary embodiment are simply described by use of the same reference numerals, for example, in FIGS. 22 to 25 as well as in FIGS. 16 to 19.

In the front case 1A of this example, as shown in FIGS. 22 and 23, a frame-shaped casing 31 and a metallic plate 32 are integrally molded through insertion molding; and there are included a part mounting section 5 and a frame section 33 formed to surround the periphery of the part mounting section 5.

The frame section 33 includes a pair of sidewall sections 34 and 35, and a notch section 36 is disposed in a predetermined location of one of the sidewall sections 34 and 35, i.e., sidewall section 34 in this example.

The metallic plate 32 includes a planar section 11 configuring a part mounting section 5, and side-plate sections 37 and 38 which configures sidewall sections 34 and 35 and which are formed by bending the metallic plate 32 with substantially a right angle with respect to the planar section 11, on both sides of the planar section 11.

In one of the side-plate sections, i.e., a side-plate section 37, the side edge section thereof in the sidewall section 34 excepting the notch section 36 and neighborhood regions 41 and 42 on both sides of the notch section 36 is bent, as shown in FIGS. 22 to 25, to be a vertical hemming-bent section 43 in which the thickness is substantially doubled, and is removed in the notch section 36; in neighborhood regions 41 and 42 on both sides of the notch section 36, the side-plate section 37 is extended from the vertical hemming-bent section 43 to the notch section 36 as a wing section 44 which is a non-hemming-bent section.

Also, in the planar section 11, regions thereof near the notch section 36 and the neighborhood regions 41 and 42 on both sides of the notch section 36 in its side edge section are bent by hemming bending work for substantially the height of the side-plate section 37 relative to the side edge end, to provide a horizontal hemming-bent section 45 in which the thickness is substantially doubled.

Furthermore, on an inner surface of the metallic plate 32, there are formed a plurality of fine projections 46 to support a metallic dome sheet configuring the operator's section.

As above, the reinforcing structure of the front case (the reinforcing structure of the frame) of this example is substantially configured such that in the planar section 11 of the metallic plate 32, regions thereof near the notch section 36 and the neighborhood regions 41 and 42 on both sides of the notch section 36 in its side edge section are bent by hemming bending work for substantially the height of the side-plate section 37, to provide the horizontal hemming-bent section 45, and the side edge section of the side-plate section 37 excepting the notch section 36 and the neighborhood regions 41 and 42 is bent to form a vertical hemming-bent section 43; in neighborhood regions 41 and 42 on both sides of the notch section 36; the side-plate section 37 is extended from the vertical hemming-bent section 43 to the notch section 36 as the wing section 44 which is a non-hemming-bent section.

In this connection, not only the notch section 36, but also the regions adjacent to the neighborhood regions 41 and 42 are the horizontal hemming-bent section 45; hence, in the neighborhood regions 41 and 42 of the notch section 36, the horizontal hemming-bent section 45 overlaps with the sidewall section 34 along the sidewall section 34, to thereby provide the reinforcement.

Additionally, the side edge section of the sidewall section 34 excepting the notch section 36 and neighborhood regions 41 and 42 on both sides thereof is bent to be the vertical hemming-bent section 43 in which the thickness is substantially doubled; and in neighborhood regions 41 and 42 on both sides of the notch section 36, the side-plate section 37 is extended from the vertical hemming-bent section 43 to the notch section 36 as a wing section 44 which is a non-hemming-bent section; the side-plate section 37 is disposed also in a location of the overlapping with the horizontal hemming-bent section 45 along the sidewall section 34, to provide the reinforcement.

A notch section is formed in a corresponding location of the rear case to be combined therewith to dispose an insertion hole (slot) of an external memory such as an SD card, an opening to expose side-key buttons, a jack section for a headphone or the like, and an opening to expose connectors to connect a charge cable and the like.

To manufacture the front case 1A of this example, an L-shaped (hook-shaped) notch section 48 is first disposed, as shown in FIG. 27, in a predetermined location of the side edge section of a planar metallic member 47, and then a side-plate section forming region 49 is separated from a horizontal hemming-bent section forming region 51.

The side-plate section forming region 49 includes a vertical hemming-bent section forming region 52 and a wing section forming region 53.

Next, along a bending line 57 for the forming of the horizontal hemming-bent section, the horizontal hemming-bent section forming region 51 is bent (folded) toward the inside with a bending angle $\theta_5$ set as ($\theta_5=180°$) to form a horizontal hemming-bent section 45 as shown in FIG. 28.

Subsequently, along a bending line 56 for the forming of the vertical hemming-bent section, the vertical hemming-bent section forming region 52 is bent toward the outside with a bending angle $\theta_4$ set as ($\theta_4=180°$), and then along a bending line 55 for the forming of the side-plate section, the side-plate section forming region 49 is bent toward the inside with a bending angle $\theta_3$ set as ($\theta_3=90°$), to thereby form the vertical hemming-bend section 43 and the wing section 44 as shown in FIG. 28. In this way, the metallic plate 32 is manufactured. Thereafter, by using a metallic mold, the front case 1A in which the metallic plate and the casing (resin-molded body) are integrally molded is manufactured through insertion molding.

In the reinforcing structure of the rear case of this example, not only the notch section 36, but also the regions adjacent to the neighborhood regions 41 and 42 are the horizontal hemming-bent section 45; hence, in the neighborhood regions 41 and 42, the horizontal hemming-bent section 45 overlaps with the sidewall section 34 along the sidewall section 34, to thereby provide reinforcement. This secures the sufficient rigidity also in the notch section 36.

Additionally, the side edge section of the sidewall section 34 excepting the notch section 36 and neighborhood regions 41 and 42 on both sides of the notch section 36 is bent to be a vertical hemming-bent section 43; and in neighborhood regions 41 and 42 on both sides of the notch section 36, the side-plate section 37 is extended from the vertical hemming-bent section 43 to the notch section 36 as a wing section 44 which is a non-hemming-bent section; the side-plate section 37 is disposed also in a location of the overlapping with the horizontal hemming-bent section 45 along the sidewall section 34, to provide the reinforcement.

Further, by disposing the wing section 44, an event wherein rigidity considerably varies in the sidewall section between the region provided with the side-plate section and the region from which the side-plate section is removed as in the first exemplary embodiment cannot take place, and the local deformation does not occur.

Also, by arranging the wing section 44, in the sidewall section 34, the resin thickness is uniform from the outer surface of the side-plate section 37 to the outer surface (decorative surface) of the sidewall section 34. That is, there cannot take place an event wherein the resin thickness considerably varies in the sidewall section between the region provided with the side-plate section and the region from which the side-plate section as in the first exemplary embodiment.

Hence, there cannot occur, in the manufacturing of resin molded items, a depression (so-called "hike" in Japanese) as an defect taking place on a surface of a location where the thickness is not uniform because material becomes lower than the mold due to the difference in the cooling speed.

In accordance with the configuration of this example, it is possible to attain the advantage almost equal to that of the first exemplary embodiment described above.

Moreover, the side edge section of the sidewall section 34 excepting the notch section 36 and neighborhood regions 41 and 42 on both sides of the notch section 36 is bent to be the vertical hemming-bent section 43; and in neighborhood regions 41 and 42 on both sides of the notch section 36, the side-plate section 37 is extended from the vertical hemming-bent section 43 to the notch section 36 as a wing section 44 which is a non-hemming-bent section; the side-plate section 37 is disposed also in a location of the overlapping with the horizontal hemming-bent section 45 along the sidewall section 34, to provide the reinforcement; hence, the rigidity can be further increased.

Additionally, since the resin is uniform in thickness in the sidewall section 34, the so-called "hike" in Japanese does not take place in the outer appearance, and it is hence possible to retain the fine appearance.

Third Exemplary Embodiment

FIG. 29 is a perspective view showing structure of a front case of a lower unit of a cellular as a third exemplary embodiment of this invention, i.e., a diagram viewed from the rear surface side; FIG. 30 is a plan view showing structure of the front case; FIG. 31 is a partial, magnified view showing a magnified view of section G of FIG. 30; and FIG. 33 is a cross-sectional view along line H-H of FIG. 30.

This example considerably differs from the second exemplary embodiment above in that a reduced section is arranged in the horizontal hemming-bent section.

The other configurations are almost equal to those of the second exemplary embodiment; hence, the same configuring components as those of the second exemplary embodiment are simply described by use of the same reference numerals, for example, in FIGS. 29 to 32 as well as in FIGS. 22 to 25.

In the front case 1B of this example, as shown in FIGS. 29 and 30, a frame-shaped casing 61 and a metallic plate 62 are integrally molded through insertion molding, and there are included a part mounting section 63 and a frame section 33 formed to surround the periphery of the part mounting section 63.

The frame section 33 includes a pair of sidewall sections 34 and 35, and a notch section 36 is disposed in a predetermined location of one of the sidewall sections 34 and 35, i.e., sidewall section 34 in this example.

The metallic plate 62 includes a planar section 68 configuring a part mounting section 63, and side-plate sections 37 and 38 which configures sidewall sections 34 and 35 and which are formed by bending the metallic plate 62 with substantially a right angle with respect to the planar section 68, on both sides of the planar section 68.

In one of the side-plate sections, i.e., a side-plate section 37, the side edge section thereof in the sidewall section 34 excepting the notch section 36 and neighborhood regions 41 and 42 on both sides of the notch section 36 is bent, as shown in FIGS. 29 to 33, to be a vertical hemming-bent section 43 in which the thickness is substantially doubled and is removed in the notch section 36; in neighborhood regions 41 and 42 on both sides of the notch section 36, the side-plate section 37 is extended from the vertical hemming-bent section 43 to the notch section 36 as a wing section 44 which is a non-hemming-bent section.

Also, in the planar section 68, regions thereof near the notch section 36 and the neighborhood regions 41 and 42 on both sides of the notch section 36 in its side edge section are bent by hemming bending work for substantially the height of the side-plate section 37 relative to the side edge end, to provide a hemming-bent section 69 in which the thickness is substantially doubled.

In this example, moreover, in the planar section 68, to arrange substantially on one and the same plane an inner surface 71 on the upper-layer side of a two-layer plate member of the horizontal hemming-bent section 69 and an inner surface 72 of a single-layer plate member in the location of the non-hemming-bent section, a reduced section 73 for which reducing work has been conducted is formed in the boundary region between the horizontal hemming-bent section 69 and the body of the planar section.

Furthermore, on an inner surface of the metallic plate 62, there are formed a plurality of fine projections 74 to support a metallic dome sheet configuring the operator's section.

As above, the reinforcing structure of the front case (the reinforcing structure of the frame) of this example is substantially configured such that in the planar section 11 of the metallic plate 32, regions thereof near the notch section 36 and the neighborhood regions 41 and 42 on both sides of the notch section 36 in its side edge section are bent by hemming bending work for substantially the height of the side-plate section 37, to provide the hemming-bent section 45; further, the reduced section 73 for which reducing work has been conducted is formed in the boundary region between the horizontal hemming-bent section 69 and the body of the planar section, and the side edge section of the side-plate section 37 excepting the neighborhood regions 41 and 42 on both sides of the notch section 36 is bent to form the vertical hemming-bent section 43; in neighborhood regions 41 and 42 on both sides of the notch section 36, the side-plate section 37 is extended from the vertical hemming-bent section 43 to the notch section 36 as the wing section 44 which is a non-hemming-bent section.

Additionally, the side edge section of the sidewall section 34 excepting the notch section 36 and neighborhood regions 41 and 42 on both sides thereof is bent to be the vertical hemming-bent section 43; and in neighborhood regions 41 and 42 on both sides of the notch section 36, the side-plate section 37 is extended from the vertical hemming-bent section 43 to the notch section 36 as a wing section 44 which is a non-hemming-bent section; the side-plate section 37 is disposed also in a location of the overlapping with the horizontal hemming-bent section 45 along the sidewall section 34, to provide the reinforcement.

Also, the side edge section of the sidewall section 34 excepting the notch section 36 and neighborhood regions 41 and 42 on both sides thereof is bent to be the vertical hemming-bent section 43 in which the thickness is substantially doubled; and in neighborhood regions 41 and 42 on both sides of the notch section 36, the side-plate section 37 is extended from the vertical hemming-bent section 43 to the notch section 36 as a wing section 44 which is a non-hemming-bent section; the side-plate section 37 is disposed also in a location of the overlapping with the horizontal hemming-bent section 45 along the sidewall section 34, to provide the reinforcement.

In addition, the reduced section 73 for which reducing work has been conducted is formed in the boundary region between the horizontal hemming-bent section 69 and the body of the planar section, to thereby enhance the rigidity.

A notch section is also formed in a corresponding location of the rear case to be combined therewith to provide an insertion hole (slot) of an external memory such as an SD card, an opening to expose side-key buttons, a jack section for a headphone or the like, and an opening to expose connectors to connect a charge cable and the like.

To manufacture the front case 1B of this example, an L-shaped (hook-shaped) notch section 48 is first disposed in a predetermined location of the side edge section of a planar metallic member 47, and then a side-plate section forming region 49 is separated from a horizontal hemming-bent section forming region 51. The side-plate section forming region 49 includes a vertical hemming-bent section forming region 52 and a wing section forming region 53.

Next, along a bending line 57 for the forming of the horizontal hemming-bent section, the horizontal hemming-bent section forming region 51 is bent (folded) toward the inside with a bending angle $\theta_5$ set as ($\theta_5=180°$) to form a horizontal hemming-bent section 45.

Subsequently, to arrange substantially on one and the same plane the inner surface 71 on the upper-layer side of a two-layer plate member of the horizontal hemming-bent section 69 and the inner surface 72 of a single-layer plate member in the location of the non-hemming-bent section, the reduced section 73 for which reducing work has been conducted is formed in the boundary region between the horizontal hemming-bent section 69 and the body of the planar section.

Next, along a bending line 56 for the forming of the vertical hemming-bent section, the vertical hemming-bent section forming region 52 is bent toward the outside with a bending angle $\theta_4$ set as ($\theta_4=180°$), and then along a bending line 55 for the forming of the side-plate section, the side-plate section forming region 49 is bent toward the inside with a bending angle $\theta_3$ set as ($\theta_3=90°$), to thereby form the vertical hemming-bent section 43 and the wing section 44 as shown in FIG. 28.

In this manner, the metallic plate 62 is manufactured. Thereafter, by using a metallic mold, the front case 1B in which the metallic plate and the casing (resin-molded body) are integrally molded is manufactured through insert molding.

In the reinforcing structure of the rear case of this example, not only the notch section 36, but also the regions adjacent to the neighborhood regions 41 and 42 are the horizontal hemming-bent section 45; hence, in the neighborhood regions 41 and 42, the horizontal hemming-bent section 45 overlaps with the sidewall section 34 along the sidewall section 34 to thereby provide reinforcement.

Moreover, to arrange substantially on one and the same plane the inner surface 71 on the upper-layer side of a two-layer plate member of the horizontal hemming-bent section 69 and the inner surface 72 of the single-layer plate member in the location of the non-hemming-bent section, the reduced section 73 for which reducing work has been conducted is formed in the boundary region between the horizontal hemming-bent section 69 and the body of the planar section; hence, also in the notch section 36, the rigidity is further increased and the mounting efficiency in the front case 1B can be improved.

Incidentally, although a depressed section is formed on the outer surface side (decorated surface side) of the horizontal hemming-bent section 69 (i.e., the side edge section of the planar section 68), the fine appearance is not affected by forming the horizontal hemming-bent section 69 in association with a location, for example, the key mounting area with relatively thick resin.

Also, the side edge section of the sidewall section 34 excepting regions of the notch section 36 and neighborhood regions 41 and 42 on both sides of the notch section 36 is bent to be the vertical hemming-bent section 43; and in neighborhood regions 41 and 42 on both sides of the notch section 36, the side-plate section 37 is extended from the vertical hemming-bent section 43 to the notch section 36 as a wing section 44 which is a non-hemming-bent section; the side-plate section 37 is disposed also in a location of the overlapping with the horizontal hemming-bent section 45 along the sidewall section 34, to provide the reinforcement.

Also, by arranging the wing section 44, the resin thickness is uniform in the sidewall section 34 from the outer surface of the side-plate section 37 to the outer surface of the sidewall section 34. Therefore, in the manufacturing of resin molded items, there does not take place a depression (so-called "hike" in Japanese) as an defect taking place on a surface of a location where the thickness is not uniform because material becomes lower than the mold due to the difference in the cooling speed.

In accordance with the configuration of this example, it is possible to attain the advantage almost equal to that of the second exemplary embodiment described above.

Additionally, since the reduced section 73 is formed in the boundary region between the horizontal hemming-bent section 69 and the body of the planar section, it is possible to further increase the rigidity.

Also, to arrange substantially on one and the same plane the inner surface 71 on the upper-layer side of the two-layer plate member of the horizontal hemming-bent section 69 and the inner surface 72 of the single-layer plate member in the location of the non-hemming-bent section, the reduced section 73 is formed to flatten the projection on the inner surface side of the horizontal hemming-bent section 69 (i.e., the side edge section of the planar section 68); hence, it is possible to secure the mounting area to mount configuring components in the front case 1B to thereby improve the mounting efficiency.

As above, description has been given in detail of embodiments of the present invention; however, specific structure is not restricted by the embodiments, and even if the designing is modified or changed within the scope of the gist of the present invention, the modified results are also included in this invention For example, in conjunction with the embodiments described above, description has been given of a case wherein the hemming-bent section is disposed in the front case configuring the housing; however, as in the front case, the hemming-bent section may also be disposed in the rear case corresponding to the front case.

In addition, the contour of the notch section is not limited to the rectangular shape, but may be other polygonal shapes, a semicircluar shape, a semi-elliptic shape, and the like. Further, this is applicable not only to the notch section, but also to a location where an opening is disposed. Here, the contour of the opening may be, in addition to the rectangular shape, other polygonal shapes, a circular shape, an elliptic shape, and the like. Additionally, this is applicable not only to a case wherein the notch section and the opening are disposed in the sidewall section, but also to a case wherein the notch section and the opening are disposed in the part mounting section.

Also, although description has been given of a case wherein the metallic plate is folded in the side edge section once, the metallic plate may be folded in two times or more.

As a result, the substantial thickness of the metallic plate can be at least three times that of the original thickness.

In addition, the metallic plate may be folded such that the side edge section is on the rear surface side. Also, the metallic plate may be subdivided into a plurality of partitions in the arrangement.

Further, the metallic plate is made of not only stainless steel, but other metal may also be employed, or an alloy such as a magnesium alloy may be used.

In addition, the embodiments have the following industrial applicability.

In association with a portable terminal, the embodiments are applicable to a cellular as a portable electronic apparatus as well as a Personal Handyphone System (PHS) terminal, a Personal Digital Assistant (PDA), and the like. Moreover, the embodiments are applicable to a foldable cellular, a cellular including a two-axis hinge, and cellulars of straight types other than the folding type.

As above, the frame reinforcing structure in accordance with the embodiments relates to frame reinforcing structure in which at least one side configuring the edge end of a rectangular notch section or opening formed in a frame is folded to provide a hemming edge end section, and is characterized in that the hemming edge end section extends over the first point and the end point of the at least one side configuring the edge end of the notch section or the opening.

Moreover, the reinforcing structure relates to the frame reinforcing structure described above, characterized in that the frame includes a bottom plate section and a sidewall section which is bent to stand in an edge end section of the bottom plate section, and in the sidewall section, the notch section or the opening is formed in a mode in which the at least one side is formed to match with the edge end section of the bottom plate section.

Additionally, the reinforcing structure relates to the frame reinforcing structure described above, characterized in that the frame includes resin and a metallic plate.

Also, the reinforcing structure relates to the frame reinforcing structure described above, characterized in that the metallic plate includes a planar section configuring the bottom section and a side-plate section in a side section of the planar section which configures the sidewall section and which is folded to stand in an edge end section of the planar section, and an end edge region of the planar section is folded to form a first hemming edge end section.

Further, the reinforcing structure relates to the frame reinforcing structure described above, characterized in that in the sidewall section near the notch section or the opening, an end edge region of the side-plate section is bent to dispose a second hemming edge end section.

Moreover, the reinforcing structure relates to the frame reinforcing structure described above, characterized in that in the vicinity of the notch section or the opening, the first hemming edge end section of the planar section and the side-plate section are disposed to partially overlap with each other.

Furthermore, the reinforcing structure relates to the frame reinforcing structure described above, characterized in that reducing work is conducted for a boundary region between a region of fold structure including the first hemming edge end section of the planar section and a region of single-layer non-fold structure of the planar section.

Additionally, the reinforcing structure relates to the frame reinforcing structure described above, characterized in that reducing work is conducted such that an inner surface of the region of the fold structure of the planar section and an inner surface of the region of the non-fold structure of the planar section are arranged on substantially one and the same plane.

Additionally, the reinforcing structure relates to the frame reinforcing structure described above, characterized in that the resin and the metallic plate are integrally molded by insertion molding.

The electronic apparatus in accordance with the embodiments relates to an electronic apparatus including a card slot or a memory slot, characterized in that frame reinforcing structure in accordance with the embodiments described above is applied to the card slot or the memory slot.

This application is the National Phase of PCT/JP2007/073256, filed Nov. 30, 2007, which is based upon and claims the benefit of priority from Japanese patent application No. 2006-332667, filed on Dec. 8, 2006, the disclosure of which is incorporated herein in its entirety by reference.

BRIEF DESCRIPTION OF DRAWINGS

FIG. 5 is an explanatory diagram to explain a related technique and is a cross-sectional view along line I-I of FIG. 4.

FIG. 6 is an explanatory diagram to explain a related technique.

FIG. 17 is a plan view showing structure of the front case.

FIG. 18 is a partial, magnified view showing a magnified view of section A of FIG. 16.

FIG. 19 is a partial, magnified view a magnified view of showing section B of FIG. 17.

FIG. 20 is an explanatory diagram to explain a method of working a metallic plate configuring the front case.

FIG. 21 is an explanatory diagram to explain a method of working a metallic plate configuring the front case.

FIG. 22 is a perspective view showing structure of a front case of a lower unit of a cellular as a second exemplary embodiment of this invention and a diagram viewed from the rear surface side.

FIG. 31 is a partial, magnified view showing a magnified view of section F of FIG. 29.

FIG. 32 is a partial, magnified view showing a magnified view of section G of FIG. 30.

FIG. 33 is a cross-sectional view along line H-H of FIG. 30.

Figure 1:
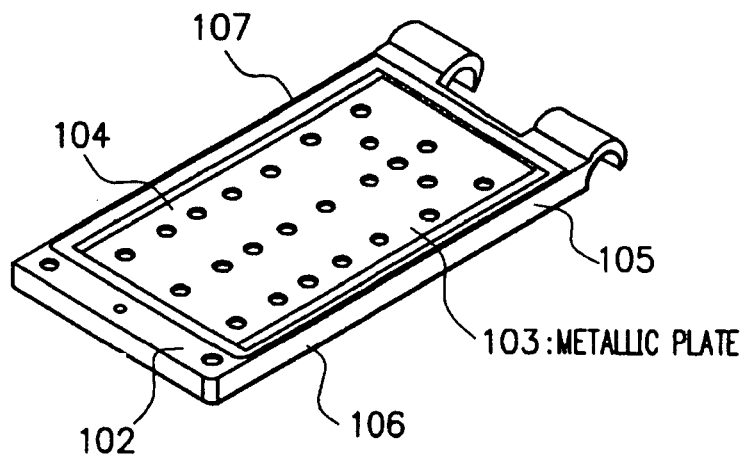
FIG. 1 is an explanatory diagram to explain a related technique.
Figure 2:
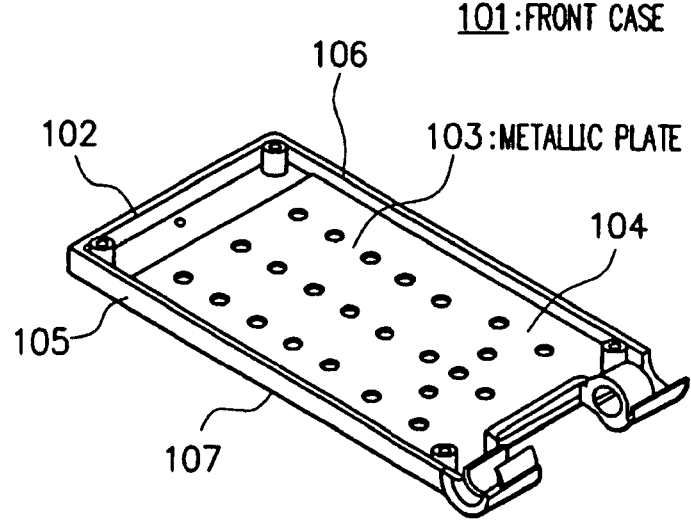
FIG. 2 is an explanatory diagram to explain a related technique.
Figure 3:
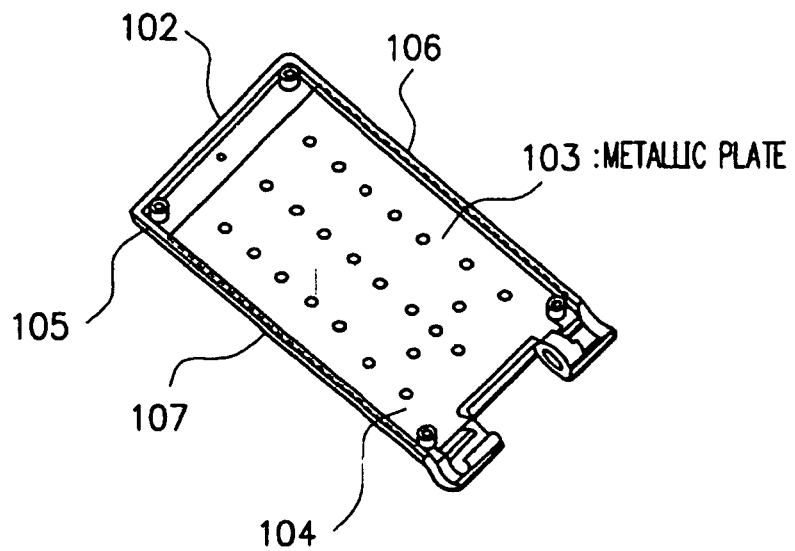
FIG. 3 is an explanatory diagram to explain a related technique.
Figure 4:
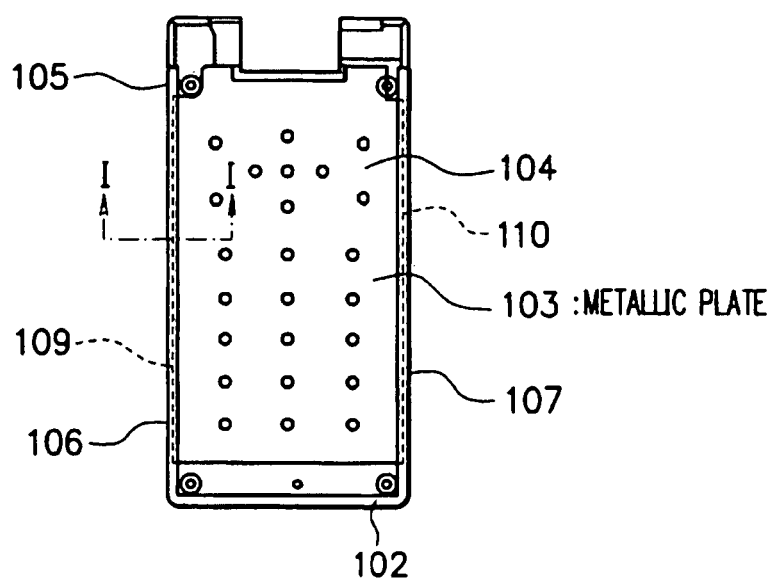
FIG. 4 is an explanatory diagram to explain a related technique.
Figure 7:
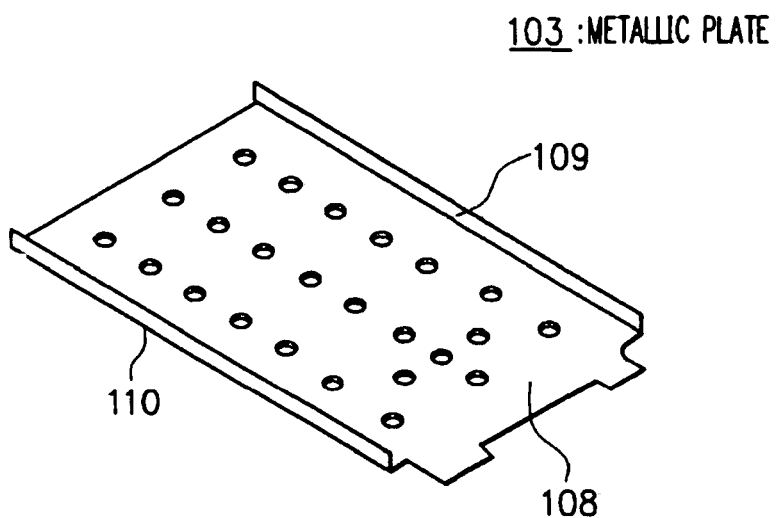
FIG. 7 is an explanatory diagram to explain a related technique.
Figure 8:
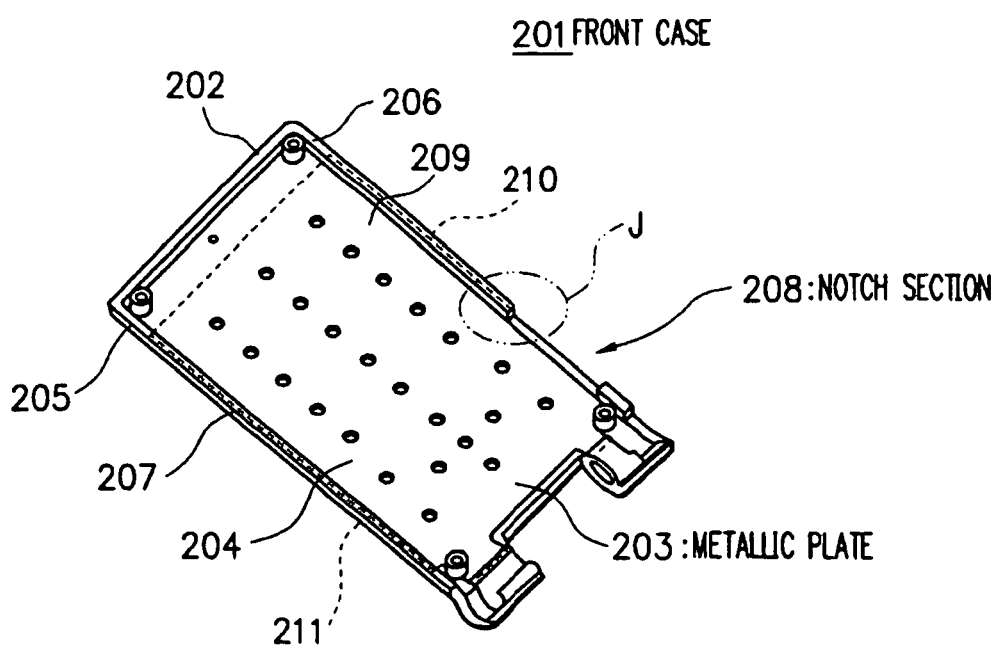
FIG. 8 is an explanatory diagram to explain a related technique.
Figure 9:
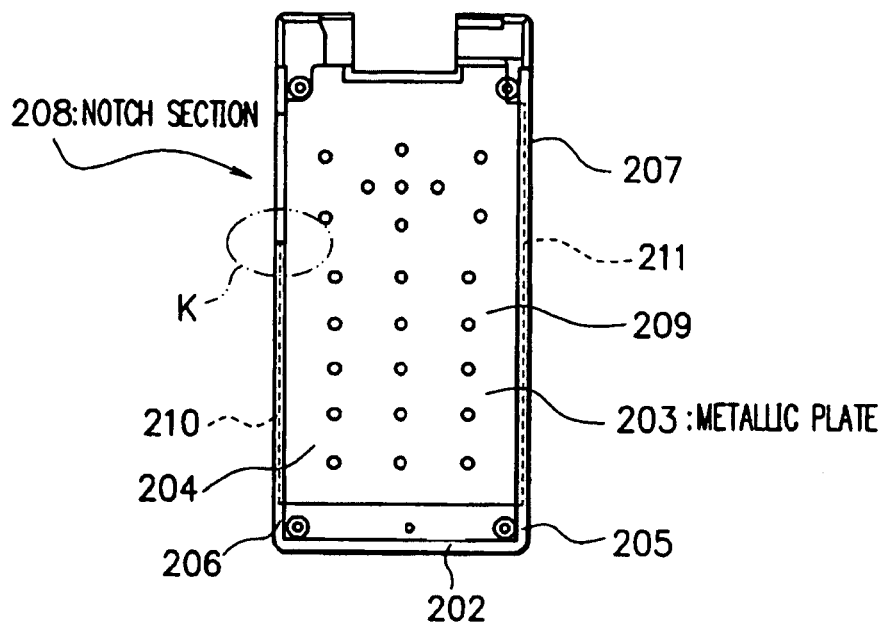
FIG. 9 is an explanatory diagram to explain a related technique.
Figure 10:
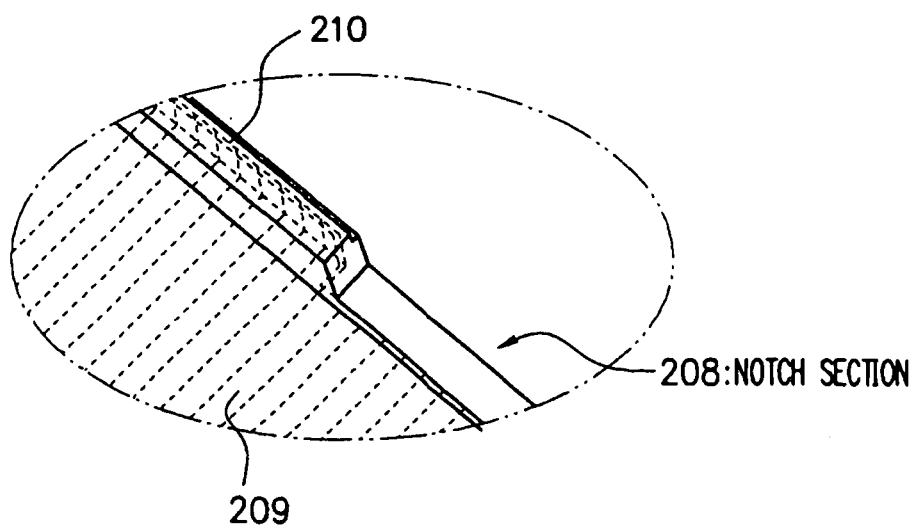
FIG. 10 is an explanatory diagram to explain a related technique and a partial, magnified view showing a magnified view of section J of FIG. 8.
Figure 11:
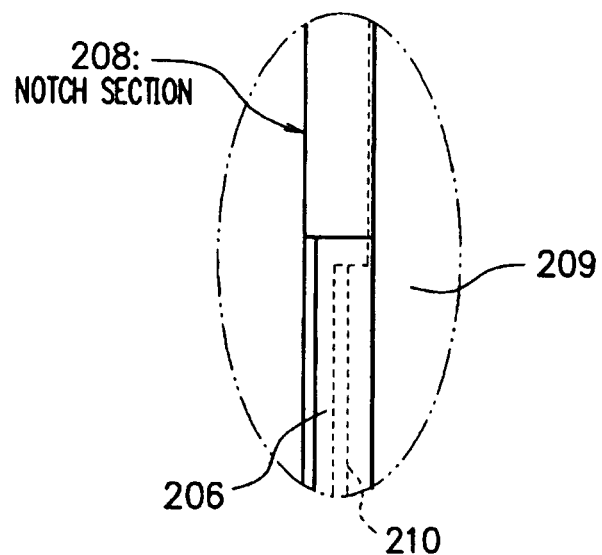
FIG. 11 is an explanatory diagram to explain a related technique and a partial, magnified view showing a magnified view of section K of FIG. 9.
Figure 12:
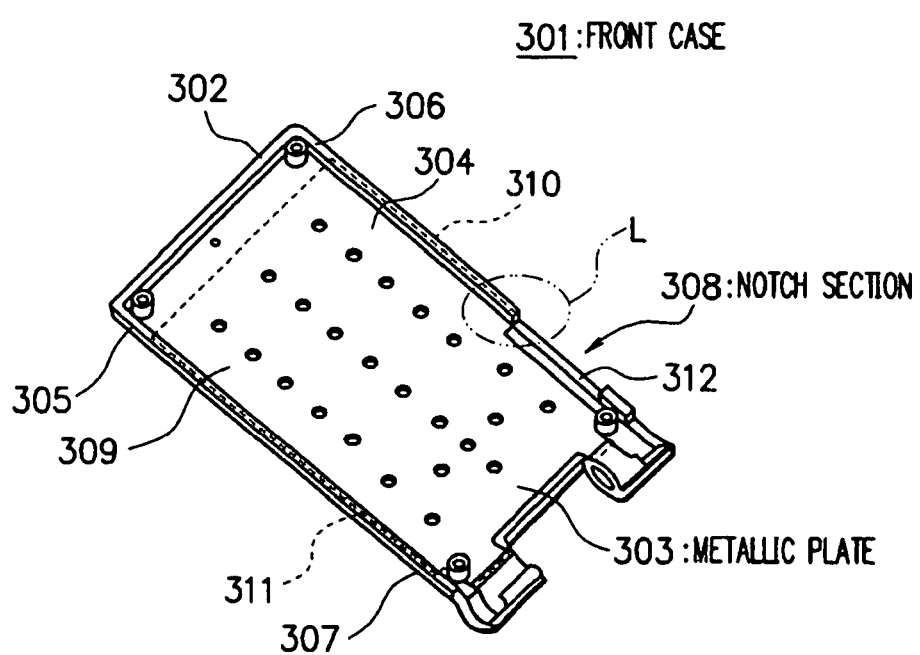
FIG. 12 is an explanatory diagram to explain a related technique.
Figure 13:
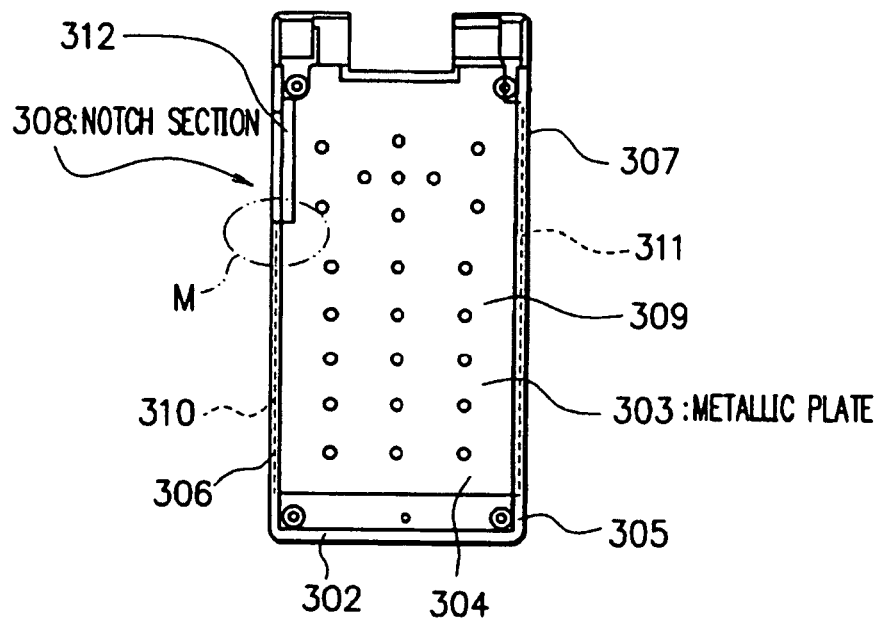
FIG. 13 is an explanatory diagram to explain a related technique.
Figure 14:
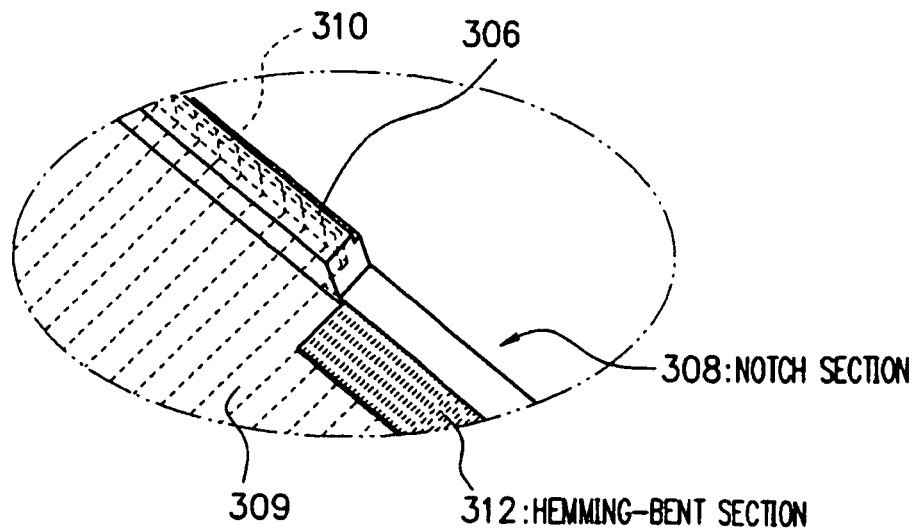
FIG. 14 is an explanatory diagram to explain a related technique and a partial, magnified view showing a magnified view of section L of FIG. 12.
Figure 15:
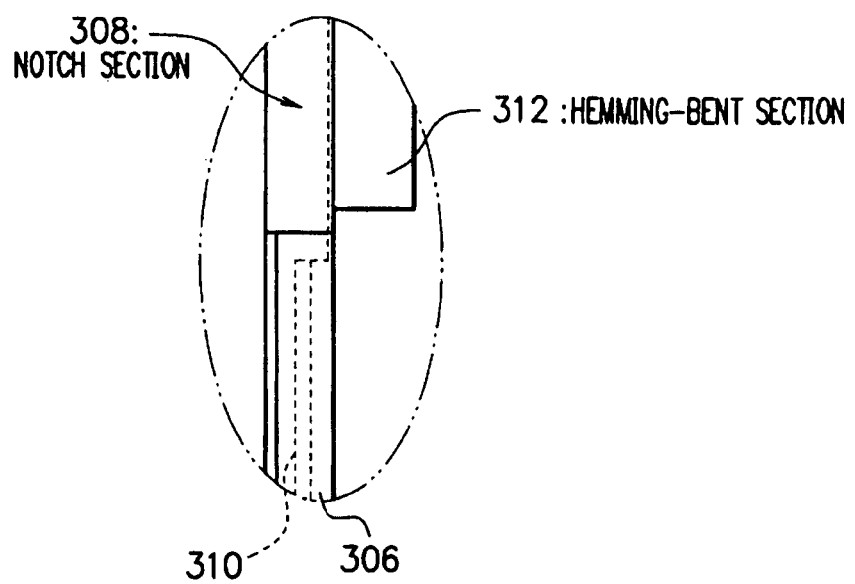
FIG. 15 is an explanatory diagram to explain a related technique and a partial, magnified view showing a magnified view of section M of FIG. 13.
Figure 16:
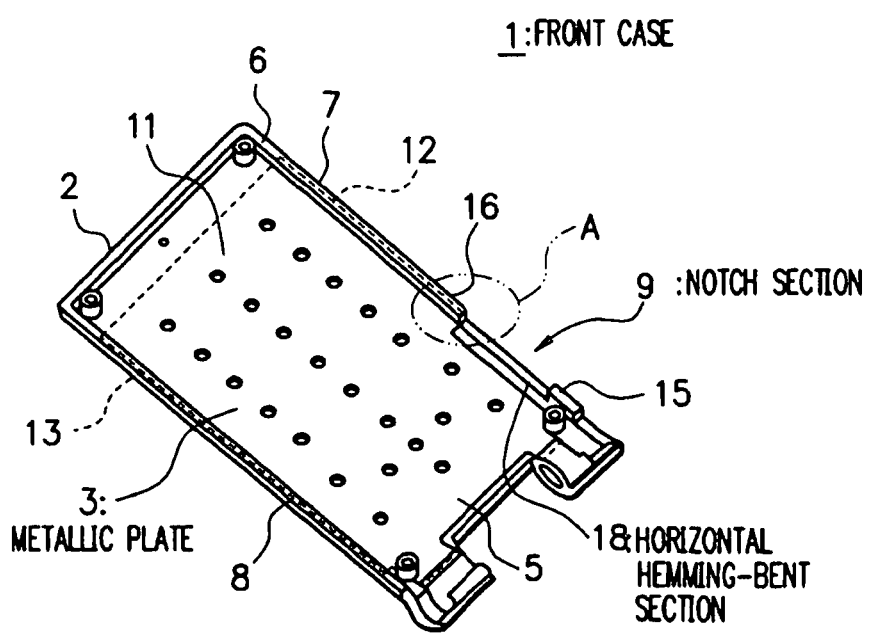
FIG. 16 is a perspective view showing structure of a front case of a lower unit of a cellular as a first exemplary embodiment of this invention and a diagram viewed from the rear surface side.
Figure 23:
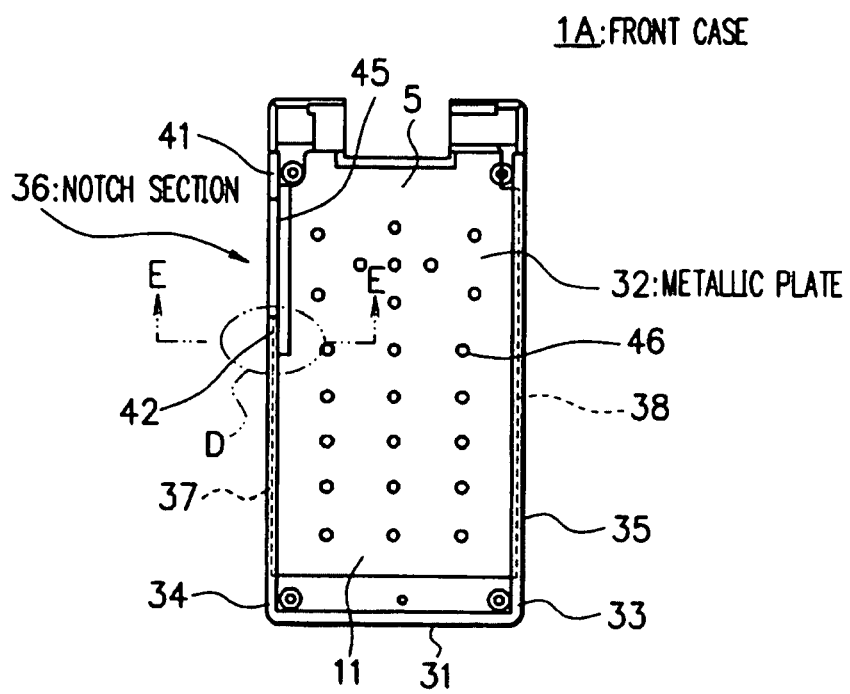
FIG. 23 is a plan view showing structure of the front case.
Figure 24:
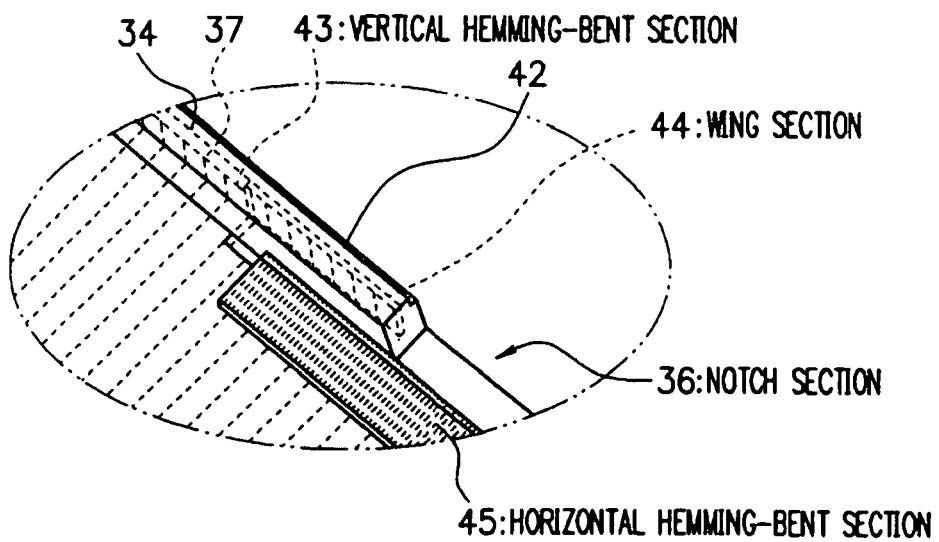
FIG. 24 is a partial, magnified view showing a magnified view of section C of FIG. 22.
Figure 25:
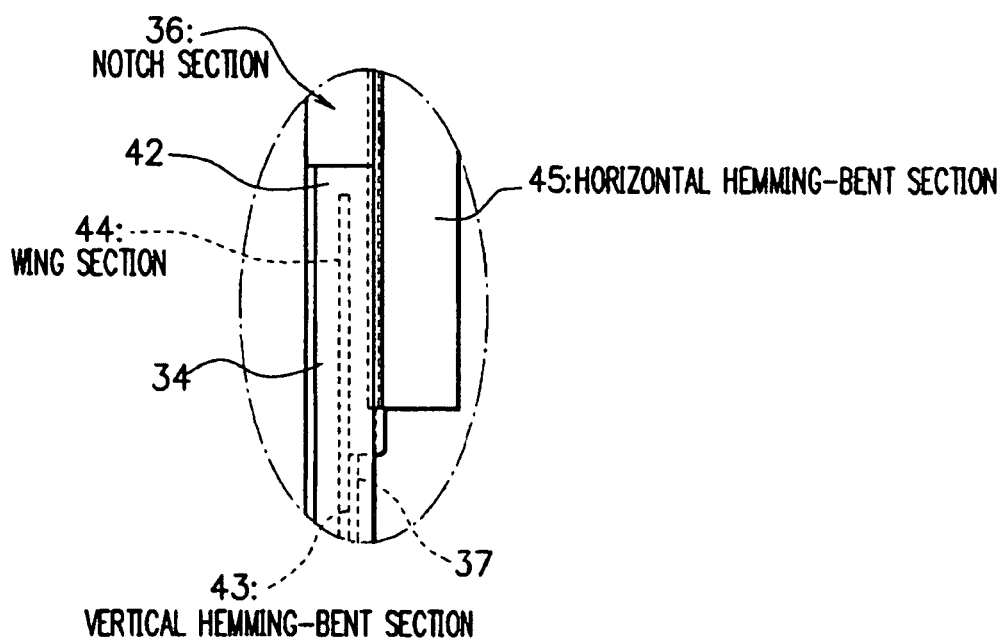
FIG. 25 is a partial, magnified view showing a magnified view of section D of FIG. 23.
Figure 26:
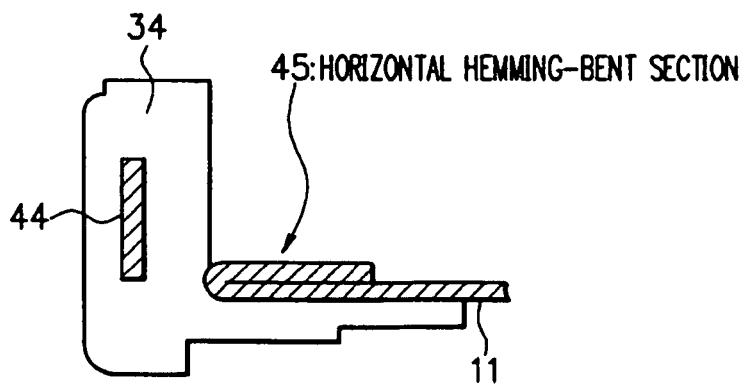
FIG. 26 is a cross-sectional view along line E-E of FIG. 23.
Figure 27:
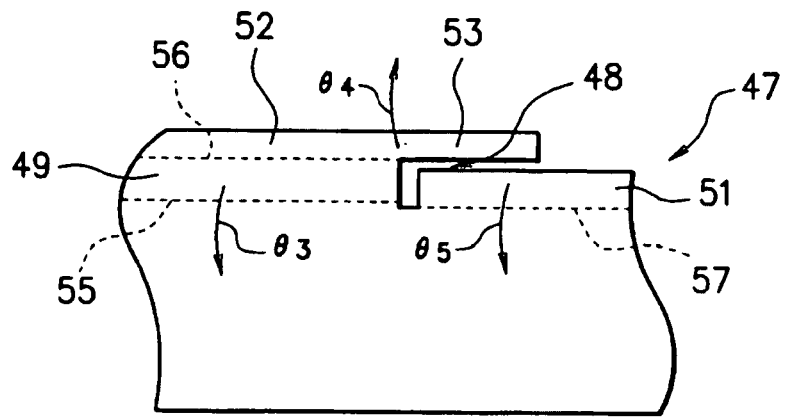
FIG. 27 is an explanatory diagram to explain a method of working a metallic plate configuring the front case.
Figure 28:
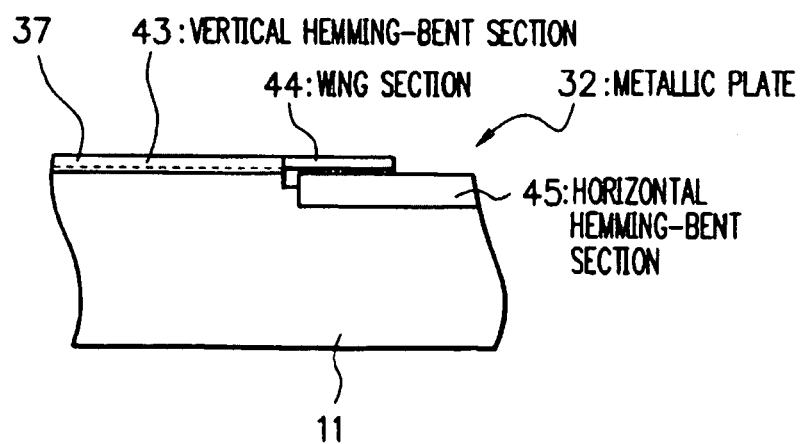
FIG. 28 is an explanatory diagram to explain a method of working a metallic plate configuring the front case.
Figure 29:
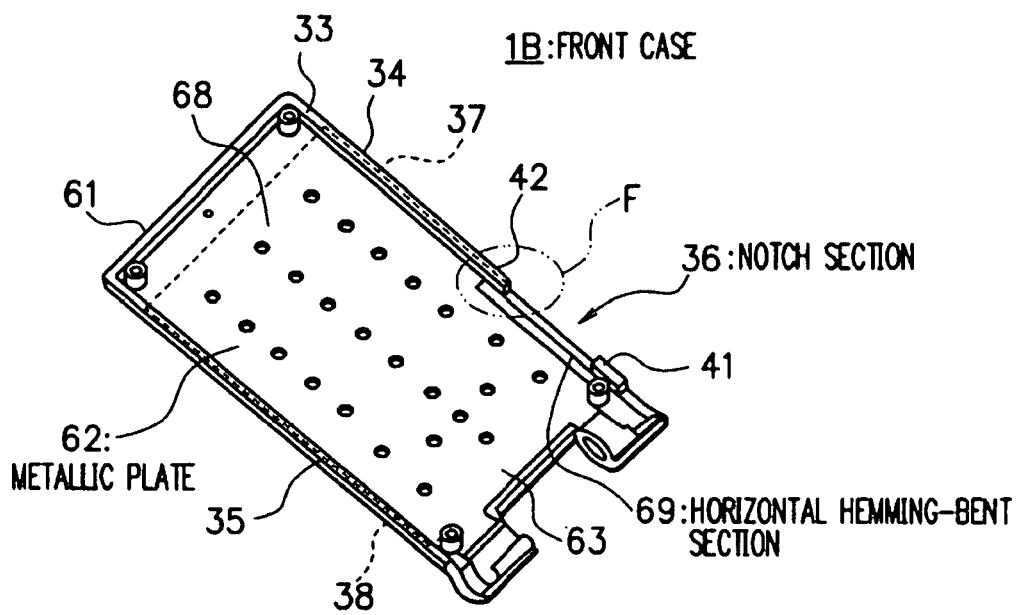
FIG. 29 is a perspective view showing structure of a front case of a lower unit of a cellular as a third exemplary embodiment of this invention and a diagram viewed from the rear surface side.
Figure 30:
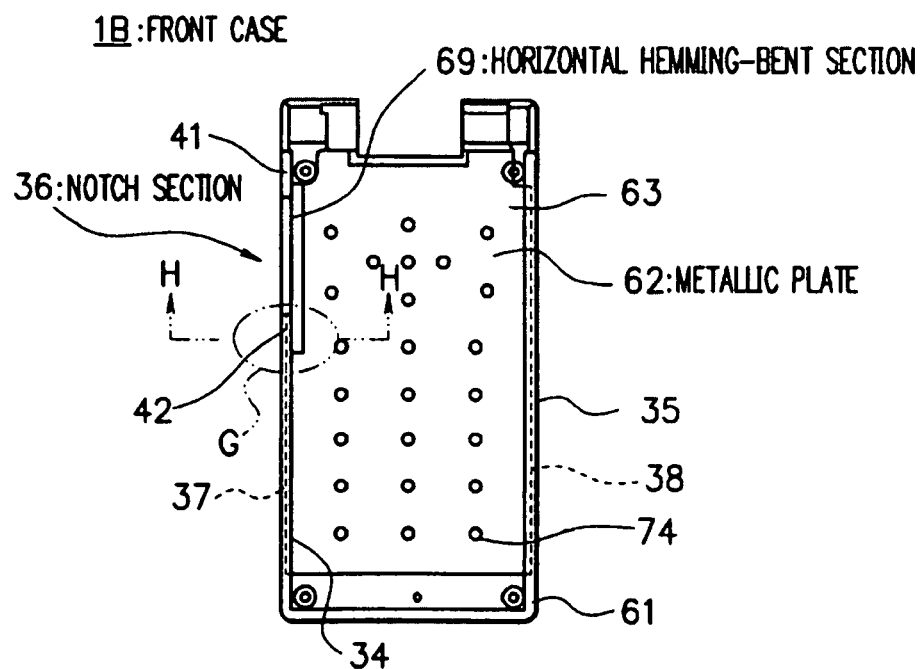
FIG. 30 is a plan view showing structure of the front case.

DESCRIPTION OF REFERENCE NUMERALS 1, 1A, 1B, 1C Front case
2 Casing (resin)
3, 32, 62 Metallic plate
5 Part mounting section (bottom plate section)
6 Frame section (periphery)
7, 8 Sidewall section
9, 36 Notch section
11 Planar section
12 Side-plate section
18, 45, 62 Horizontal hemming-bent section (hemming edge end section, first hemming edge end section)
43 Vertical hemming-bent section (second hemming edge end section)
44 Wing section
73 Reduced section

The invention claimed is:

1. A frame reinforcing structure for a frame that comprises a sidewall having a notch section or opening disposed between a first portion of the sidewall and a second portion of the sidewall, the frame-reinforcing structure comprising: a planar section disposed in a plane that is substantially perpendicular to the sidewall, and includes a fold structure extending from the first portion of the sidewall to the second portion of the sidewall, and overlapping the first portion and the second portion of the sidewall from the inside of the sidewall.

2. The frame reinforcing structure in accordance with claim 1, wherein the fold structure is a hemming edge end section in which an edge end section is folded by hemming bending work.

3. The frame reinforcing structure in accordance with claim 1, wherein the frame includes a bottom plate section and the sidewall section which is bent to stand in an edge end section of the bottom plate section, and in the sidewall section, the notch section or the opening is formed in a mode in which at least one side is formed to match with the edge end section of the bottom plate section.

4. The frame reinforcing structure in accordance with claim 1, wherein the frame includes resin and a metallic plate.

5. The frame reinforcing structure in accordance with claim 4, wherein the metallic plate includes a planar section configuring the bottom section and a side-plate section in a side section of the planar section which configures the sidewall section and which is folded to stand in an edge end section of the planar section, and an end edge region of the planar section is folded to form a first hemming edge end section.

6. The frame reinforcing structure in accordance with claim 4, wherein in the sidewall section near the notch section or the opening, an end edge region of the side-plate section is bent to dispose a second hemming edge end section.

7. The frame reinforcing structure in accordance with claim 5, wherein in the vicinity of the notch section or the opening, the first hemming edge end section of the planar section and the side-plate section are disposed to partially overlap with each other.

8. The frame reinforcing structure in accordance with claim 5, wherein reducing work is conducted for a boundary region between a region of fold structure including the first hemming edge end section of the planar section and a region of single-layer non-fold structure of the planar section.

9. The frame reinforcing structure in accordance with claim 8, wherein reducing work is conducted such that an inner surface of the region of the fold structure of the planar section and an inner surface of the region of the non-fold structure of the planar section are arranged on substantially one and the same plane.

10. The frame reinforcing structure in accordance with claim 4, wherein the resin and the metallic plate are integrally molded by insertion molding.

11. An electronic apparatus comprising a card slot or a memory slot, wherein the frame reinforcing structure in accordance with claim 1 is applied to the card slot or the memory slot.

* * * * *